March 10, 1959          A. D. WHITE          2,877,417

GAS TUBE MICROWAVE DETECTOR

Filed Nov. 28, 1955

INVENTOR
ALAN D. WHITE
BY Henry Kolin
AGENT

United States Patent Office 2,877,417
Patented Mar. 10, 1959

2,877,417

GAS TUBE MICROWAVE DETECTOR

Alan D. White, Plainfield, N. J., assignor to International Telephone and Telegraph Corporation, Nutley, N. J., a corporation of Maryland Application November 28, 1955, Serial No. 549,279

6 Claims. (Cl. 324—95)

This invention relates to methods and means for detecting and measuring microwave energy, and more specifically to the utilization for this purpose of the power absorption properties of a gas discharge plasma.

Microwave energy is ordinarily measured either by thermal or by electrical methods. In the thermal method, the high-frequency power propagated is converted to heat, which is then measured by a temperature-responsive technique. For high-level power, that is, in excess of one watt, measurement of the thermal energy is usually made by a calorimetric method, using either water or a gas such as ammonia as the calorimetric fluid. For low- and medium-level power measurements, various types of bolometers, principally those such as the barreter and the thermistor, have been used. These latter are temperature-responsive relatively sensitive power detectors which are capable of measuring a few microwatts of power when used in properly designed bridge circuits. The calorimetric and balometric methods are severely limited in actual practice because of their temperature sensitivity. Thus, they must be used under essentially isothermal conditions, or precise temperature compensation must be provided. In addition to the temperature sensitivity of these devices, they are relatively slow acting and their over-all sensitivity further depends upon the precision and sensitivity of the complex measuring circuits, such as bridge circuits, in which they are used.

The electrical methods for the detection of microwave energy involve rectification of this microwave energy; i. e., conversion to a low frequency, by means of a non-linear element and the detection of this energy by ordinary low-frequency techniques. Useful non-linear electrical devices for accomplishing this demodulation are the germanium and silicon crystal detectors. These may be of the point-contact or junction type, and, in general, have good non-linearity response at microwave frequencies. However, such crystal detector devices as now known are not operable at substantially elevated ambient temperatures. Furthermore, their power-handling capacities with respect to withstanding high-peak powers are severely limited. Also, these devices are frequently erratic and unreliable in use.

Attempts have also been made to use close-spaced vacuum diodes for microwave detection. Because of the large transit time of the electrons between the elements of the tubes, the conversion or rectification efficiency is relatively low. Attempts to improve this rectification efficiency by a closer spacing of the electrode elements have proven unsatisfactory. The precise tolerances required for this close spacing make such tubes extremely difficult to construct with any degree of reliability. A considerable need therefore exists for a simple, reliable device for detecting and measuring microwave energy. I have discovered that such a device may be obtained by providing microwave power absorption within a gas discharge plasma, and utilizing this property for microwave detection.

It is an object of the present invention to provide a simple detector for microwave energy that is free from the limitations of known devices as hereinbefore described.

It is a further object to provide such a detector which is particularly useful at higher ambient temperatures than can be used with known electrical detectors.

It is still a further object to provide a detector for microwave power that is capable of handling low-, medium-, and high-level power.

It is a feature of this invention that a gas discharge tube is filled with a gaseous mixture at such a pressure that the microwave signal frequency of the propagated microwave energy is comparable to the electron-molecule collision frequency. Microwave power input to the gas discharge causes a drop in the direct-current power input necessary to maintain the same degree of ionization in the gas discharge. This change in power input is then measured.

The above-mentioned and other features and objects of this invention and the manner of attaining them will become more apparent by reference to the following description taken in conjunction with the accompanying drawings, wherein.

Figure 1:
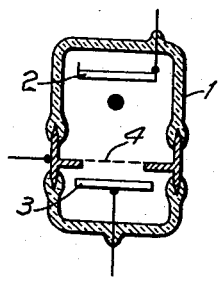
Fig. 1 is a cross-sectional view of an embodiment of a gas discharge tube of this invention.
Figure 2:
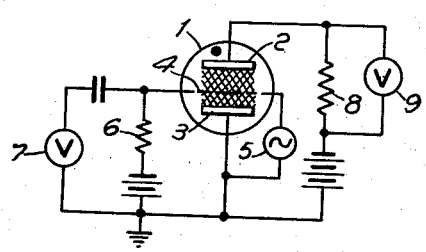
Fig. 2 is a schematic diagram illustrating the operation of the tube of Fig. 1.

In Fig. 1 is shown an embodiment of a gas discharge tube particularly suitable for the detection of low-level microwave signals. The gas discharge tube 1 comprises a cathode 2 and an anode 3 and contains a filling of a non-electronegative gas mixture, such as a rare gas mixture. Neon plus 1 percent argon, maintained at such a pressure that the microwave signal frequency is comparable to the electron-molecule collision frequency, is preferable in this regard. Thus, the collision frequency for thermal electrons is approximately $10^8$ per millimeter of mercury pressure. For an input signal frequency of 1,000 megacycles, a gas pressure of 10 millimeters of mercury would give a comparable collision frequency. Where the two frequencies are comparable, maximum power absorption occurs. A fine-mesh grid 4 is spaced a few thousandths of an inch from the anode 3 and maintained at such a potential with respect to the anode that there is little or no net current flow to the grid. A spacing of from .002 inch to .005 inch is considered suitable in the practice of this invention. The microwave signal source 5 to be detected is impressed across the grid 4 and anode 3 as indicated in Fig. 2. The anode is selected in preference to the cathode since the latter presents noise difficulties.

The operation of the tube may be explained as follows, reference being made to Fig. 2. The direct-current power input to the discharge plasma between grid 4 and anode 3 is given by $v_i$, where $v$ is the difference in direct-current potential between a point in the plasma at grid 4 and the anode 3, and $i$ is the discharge current. This power input is necessary to maintain the proper degree of ionization in this region against wall losses, elastic collision losses, recombination losses, and the like. Any additional power input to the discharge in this region will cause a drop in the direct-current power input necessary to maintain the same degree of ionization. If a microwave signal of $dP$ watts is absorbed by the plasma, the change in direct-current input to the plasma is given by $$dP = idv + vdi$$

where $dv$ is the change in direct voltage across the plasma and $di$ is the change in direct current through the plasma.

The change in potential, $dv$, exists between the grid 4 and the gas discharge plasma immediately adjacent to it. Hence, a small current, $di$, flows given by $$di = \frac{dv}{R+Z}$$

where R is the load resistance 6 and Z is the impedance from grid to plasma. The output voltage $v_o$ developed across load resistor 6 is given by $$v_o = diR$$

Combining the foregoing equations, we find that $$v_o = \frac{RdP}{i(R+Z)+v}$$

For a typical experimental tube, for purposes of illustration only, the values of R, $i$, Z and $v$ were found to be as follows: $R=1$ megohm, $i=1$ milliampere, $Z=10^4$ ohms and $v=20$ volts. For a power input of 10 microwatts, $v_o$ is calculated to be $$v_o = \frac{10^6 \times 10^{-5}}{10^{-3}(10^6+10^4)-20} = 10^{-2} \text{ volts}$$

Experimentally, $v_o$ is measured to be $0.3 \times 10^{-2}$ volts with less than half the available microwave power matched into the plasma. Any convenient voltage indicating means 7 may be used to measure $v_o$.

A simple calculation can be made to show the minimum detectable power if the assumption is made that the video noise voltage developed by the plasma is equal to the noise voltage developed by a resistor Z at temperature $T_e$, where $T_e$ is the electron temperature of the plasma, approximately equal to $10^4$ degrees Kelvin:

$$v_n = \sqrt{4KT_e BZ}$$

where B is the amplifier bandwidth of approximately 1 megacycle per second. Substituting in the foregoing equation, $$v_n = \sqrt{4 \times 1.4 \times 10^{-23} \times 10^4 \times 10^4 \times 10^6}$$

$v_n = 7.5 \times 10^{-5}$ volts or approximately $10^{-4}$ volts; for $v_o$ equal to $v_n$, the microwave signal power is found equal to $10^{-7}$ watts. Experimentally, a pulsed microwave signal of 66 decibels below a watt could be detected. The microwave power absorbed can also be detected by noting the change in current flow through the resistor 8 in the anode-cathode circuit. Any convenient type of voltage detecting means 9 may be used for this purpose, as shown in Fig. 2.

Figure 3:
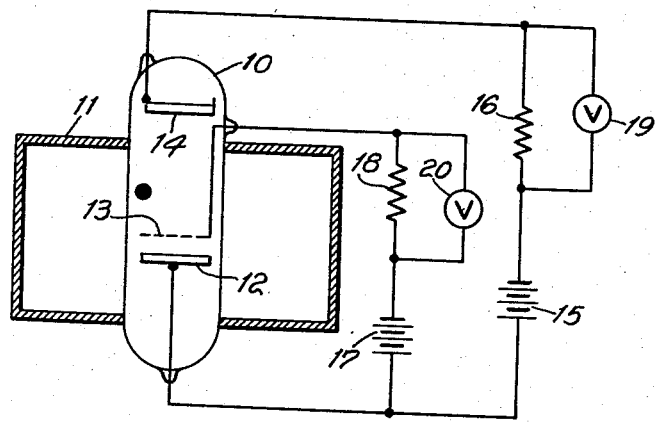
Fig. 3 is a cross-sectional view of an additional embodiment of a gas discharge tube directly associated with a waveguide structure.

Another embodiment of the gas discharge tube of this invention used directly in conjunction with a waveguide or cavity is illustrated in Fig. 3. The gas tube 10 is inserted in a waveguide 11, which may be ridged if desired, with the anode 12 and the grid 13 disposed in close-spaced relation in the waveguide for absorption of either a minor portion or preferably a substantial portion of the microwave energy propagated along this waveguide. The stable gaseous discharge is maintained between anode 12, cathode 14 and grid 13 by means of an external voltage source 15 and current limiting resistor 16. The grid 13 and the anode 12 are disposed in the waveguide or cavity in such a way that a high radiofrequency voltage appears across the grid 13 and anode 12. The anode is selected rather than the cathode since the latter is noisy. The grid is biased with respect to the anode by an external potential source 17. Alternatively, it can be biased with series resistor 18 which may also function as a load resistor. A change in voltage drop as a result of a change in current flow through resistor 16 in the cathode-anode circuit because of the absorption of microwave power within the gas discharge plasma, as discussed for Fig. 2, may be readily detected by voltage responsive means 19. Because of the low impedance which can be realized between the grid 13 and the anode 12, the detector device can be made to have good video bandwidth. Voltage detecting means 20 may be alternatively and preferably used as illustrated in Fig. 3 to detect a change in voltage drop across resistor 18 in the grid circuit as a result of microwave power absorption in the gas discharge plasma. In this embodiment, the waveguide 11 is preferably of the hollow rectangular form, and the tube 10 extends through openings in the top and bottom walls thereof. As may be seen, the mode of operation of the gas discharge tube 10 in the waveguide structure 11 is substantially as illustrated in Fig. 2 and corresponds in function to tube 1 previously described.

As mentioned, maximum absorption of microwave energy occurs upon propagation of the microwave energy through the gas discharge tubes herein described when the frequency of the propagated microwave energy is comparable to the electron-molecule collision frequency. However, absorption still occurs in varying amounts when other relationships between the two frequencies are found. With the devices described, signals of low power, i. e., below 10 milliwatts; medium power, from 10 milliwatts to 1 watt; and high power, about 1 watt; may be detected using substantially the same devices. These devices are not temperature sensitive and thus may be used in uncompensated temperature circuits and also at ambient temperatures far in excess of those at which crystal detectors of the germanium and silicon types cease to be operative. The only limitations to the power peaks handled by the devices are those imposed by the power-handling capabilities of the grid. This power handling may, of course, be increased where desired. Non-electronegative devices, such as the rare gases or mixtures thereof including hydrogen, may be used in the practice of this invention. While the devices described are capable of acting as microwave detectors at a frequency range from 100 to 20,000 megacycles, a preferred range is between 1,000 and 12,000 megacycles.

While I have described above the principles of my invention in connection with specific apparatus and methods, it is to be clearly understood that this description is made only by way of example and not as a limitation to the scope of my invention as set forth in the objects thereof and in the accompanying claims.

I claim:

1. A device for detecting electromagnetic wave energy comprising means retaining a non-electronegative gas mixture at such a pressure that when said gas is ionized the electron-molecule collision frequency is comparable to the frequency of the electromagnetic wave energy, a pair of electrodes associated with said gas, means to apply a potential across said electrodes to ionize said gas and to maintain said gas ionized throughout the operation of said detecting device, a third electrode disposed in close-spaced relation to one of said pair of electrodes, means to apply to said third electrode a potential close to the potential of said one electrode so that little or no current flows through said gas to said third electrode, means to apply electromagnetic waves across said one and said third electrodes, and means to indicate absorption by said gas of energy from said electromagnetic waves.

2. A device according to claim 1, wherein said absorption indicating means includes means to indicate absorption by the amount of current induced in a circuit of said one and third electrodes.

3. A device according to claim 1, wherein said absorption indicating means includes means to indicate absorption by a change of current flowing in the circuit of said pair of electrodes.

4. A device for indicating electromagnetic wave energy comprising means retaining a non-electronegative gas mixture at such a pressure that when said gas is ionized the electron-molecule collision frequency is comparable to the frequency of the electromagnetic wave energy, a cathode and an anode associated with said gas, means to apply a potential across said cathode and anode to ionize said gas and to maintain said gas ionized throughout the operation of said detecting device, a grid disposed in close-spaced relation to said anode, means to apply to said grid a potential close to the potential of said anode so that little or no current flows through said gas to said grid, means to apply electromagnetic waves across said anode and said grid, and means to indicate absorption by said gas of energy from said electromagnetic waves.

5. A device according to claim 4, wherein said grid comprises a fine-mesh structure spaced from .002 to .005 inch from said anode.

6. A device for detecting electromagnetic wave energy comprising a hollow rectangular waveguide having an opening through two opposed walls thereof, a gas discharge tube containing a non-electronegative gas mixture disposed in said opening, said tube having cathode, anode and grid electrodes, at least said anode and grid electrodes being disposed within the confines of said waveguide in close-spaced relation to one another, means to apply a potential across said cathode and anode electrodes to ionize the gas mixture contained in said tube and to maintain said gas mixture ionized throughout the operation of said detecting device, said ionized gaseous medium being at such a pressure that the electron-molecule collision frequency therein is comparable to the frequency of the electromagnetic wave energy, means to apply to said grid a potential close to the potential of said anode so that little or no current flows through said gas to said grid, means to apply electromagnetic waves across said anode and grid, and means to indicate absorption by said gas of energy from said electromagnetic wave.

References Cited in the file of this patent

UNITED STATES PATENTS

| | | |
|---|---|---|
| 1,629,009 | Snook | May 17, 1927 |
| 2,123,242 | Hollmann | July 12, 1938 |
| 2,333,119 | Packard | Nov. 2, 1943 |